Figures 16, 18:
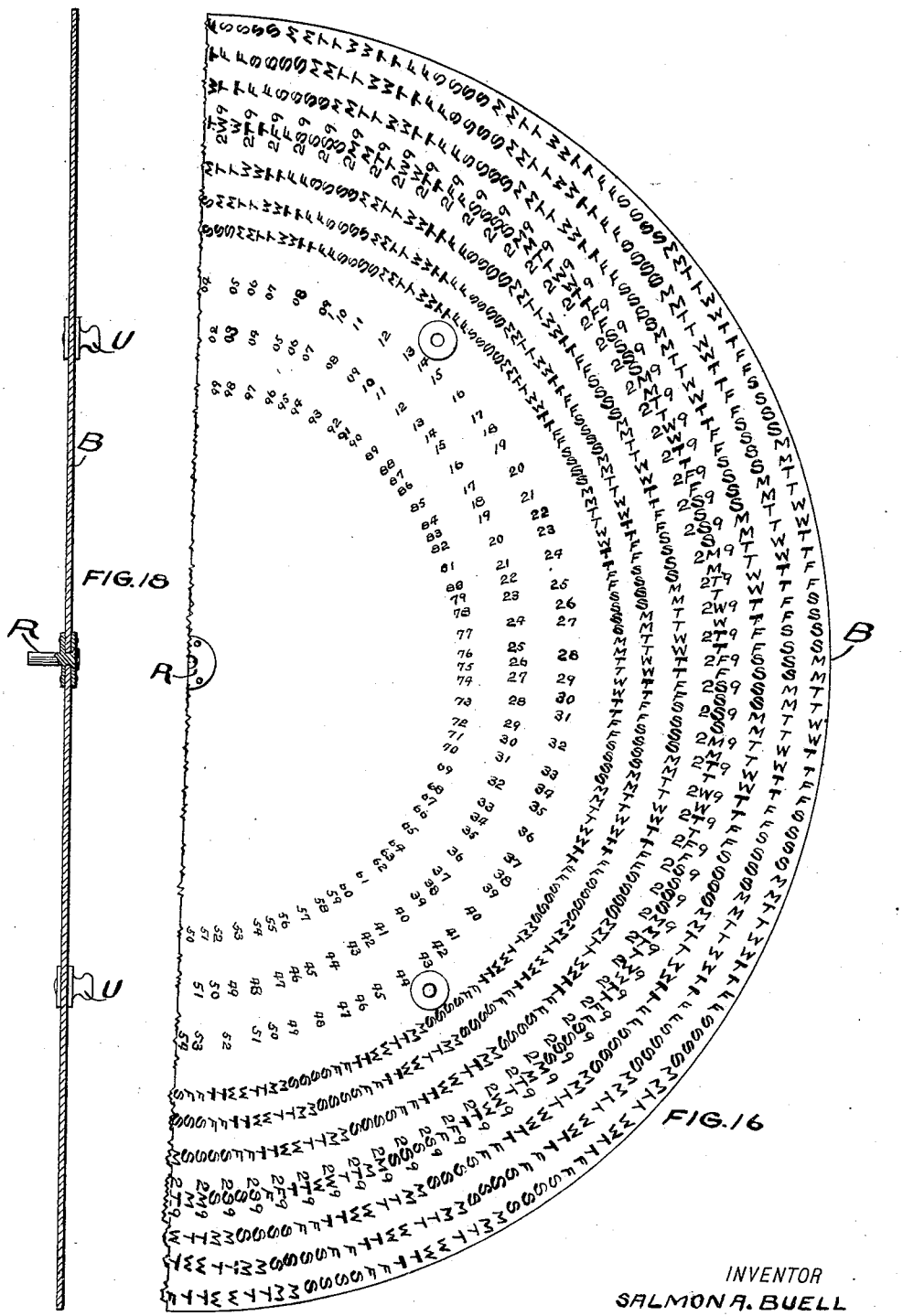

No. 641,433.　　　　　　　　　　　　　　　　　Patented Jan. 16, 1900.
S. A. BUELL.
ADJUSTABLE PERPETUAL CALENDAR.
(Application filed Dec. 19, 1898.)

(No Model.)　　　　　　　　　　　　　　　　　　　　12 Sheets—Sheet 1.

FIG. 1

WITNESSES:

INVENTOR
SALMON A. BUELL
BY Paul & Hawley
His ATTORNEYS

No. 641,433.  
S. A. BUELL.  
Patented Jan. 16, 1900.

ADJUSTABLE PERPETUAL CALENDAR.

(Application filed Dec. 19, 1898.)

(No Model.)  
12 Sheets—Sheet 2.

FIG. 2

WITNESSES  
INVENTOR  
SALMON A. BUELL  
BY  
His ATTORNEYS

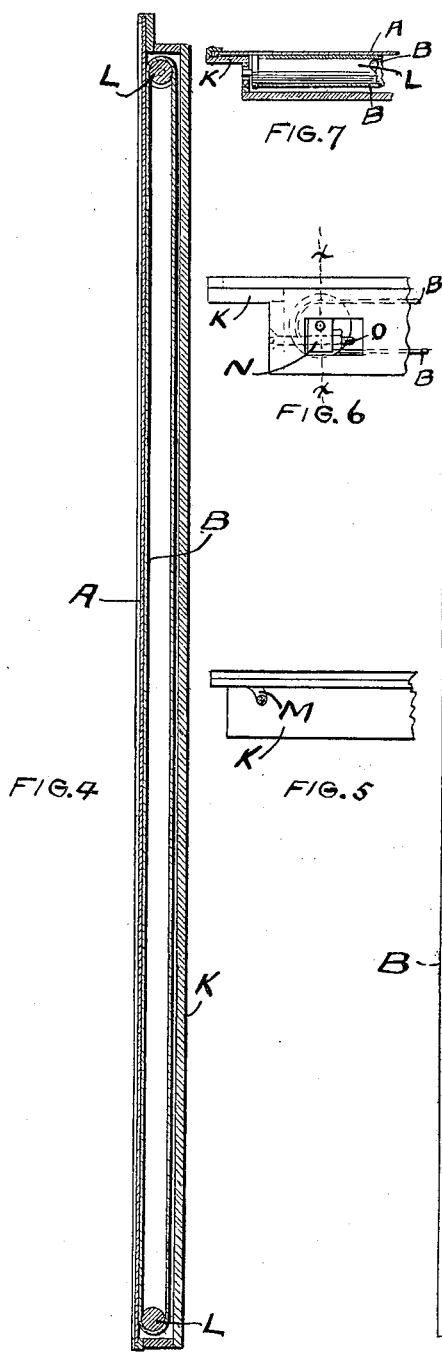

No. 641,433. Patented Jan. 16, 1900.
S. A. BUELL.
ADJUSTABLE PERPETUAL CALENDAR.
(Application filed Dec. 19, 1898.)
(No Model.) 12 Sheets—Sheet 4.
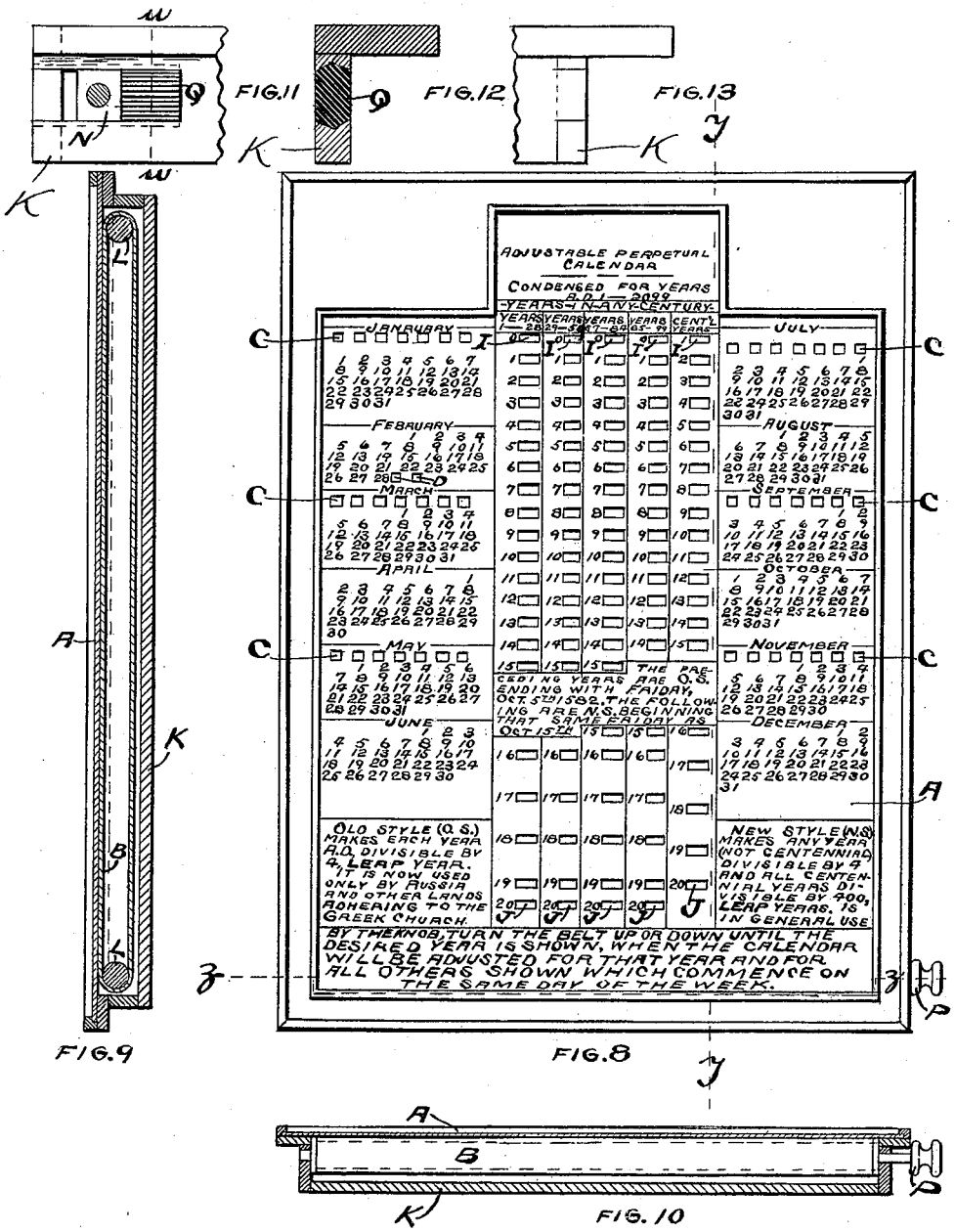
WITNESSES:
INVENTOR
SALMON A. BUELL
BY
His ATTORNEYS, No. 641,433.  
S. A. BUELL.  
Patented Jan. 16, 1900.  
ADJUSTABLE PERPETUAL CALENDAR.  
(Application filed Dec. 19, 1898.)  
(No Model.)  
12 Sheets—Sheet 5.

FIG. 14

WITNESSES:  
E. G. Staude  
Richard Paul

INVENTOR  
SALMON A. BUELL

BY Paul & Hawley  
His ATTORNEYS.

No. 641,433. Patented Jan. 16, 1900.
S. A. BUELL.
ADJUSTABLE PERPETUAL CALENDAR.
(Application filed Dec. 19, 1898.)
(No Model.) 12 Sheets—Sheet 6.
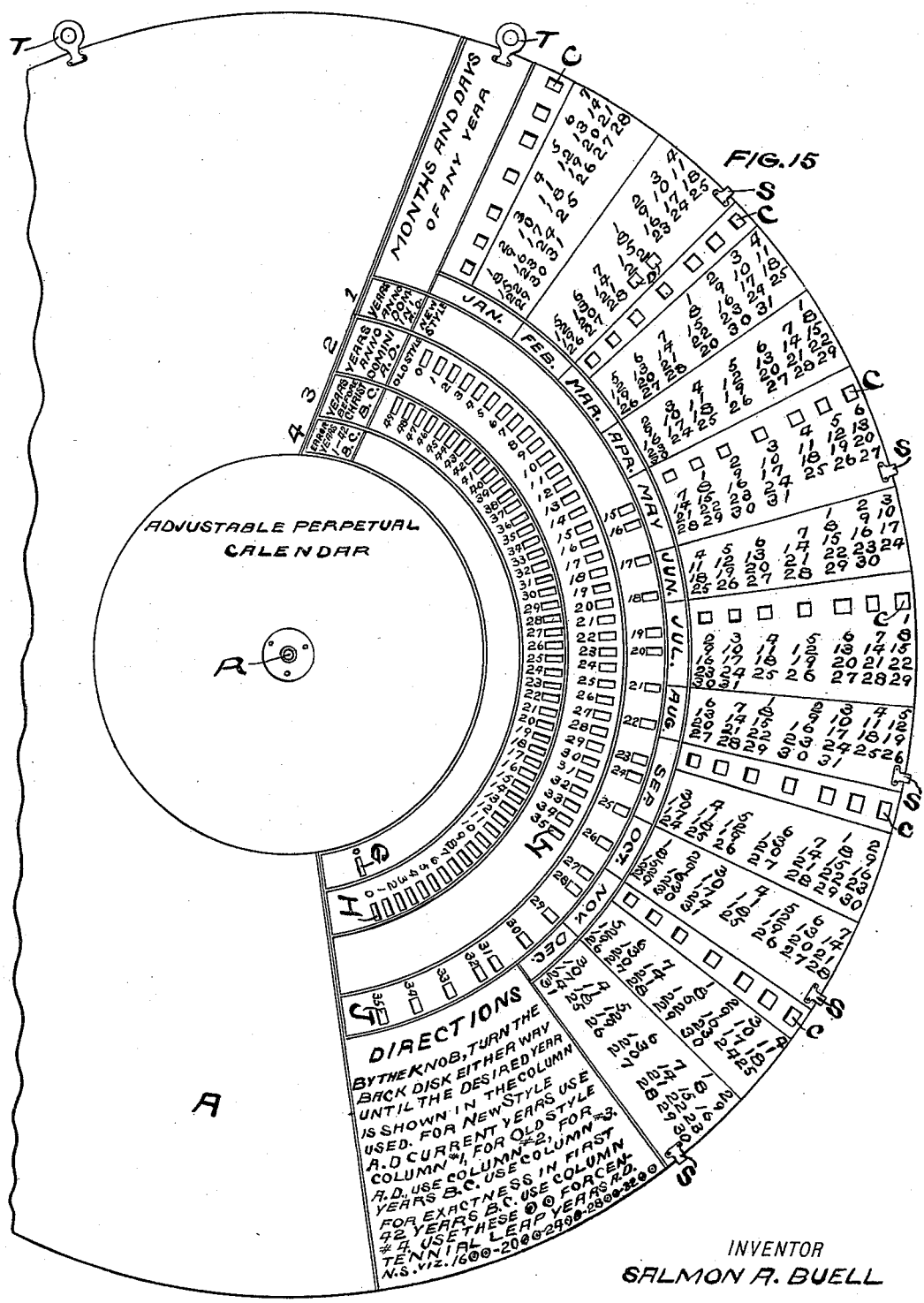
INVENTOR
SALMON A. BUELL

INVENTOR
SALMON A. BUELL

No. 641,433. Patented Jan. 16, 1900.
S. A. BUELL.
ADJUSTABLE PERPETUAL CALENDAR.
(Application filed Dec. 19, 1898.)
(No Model.) 12 Sheets—Sheet 8.
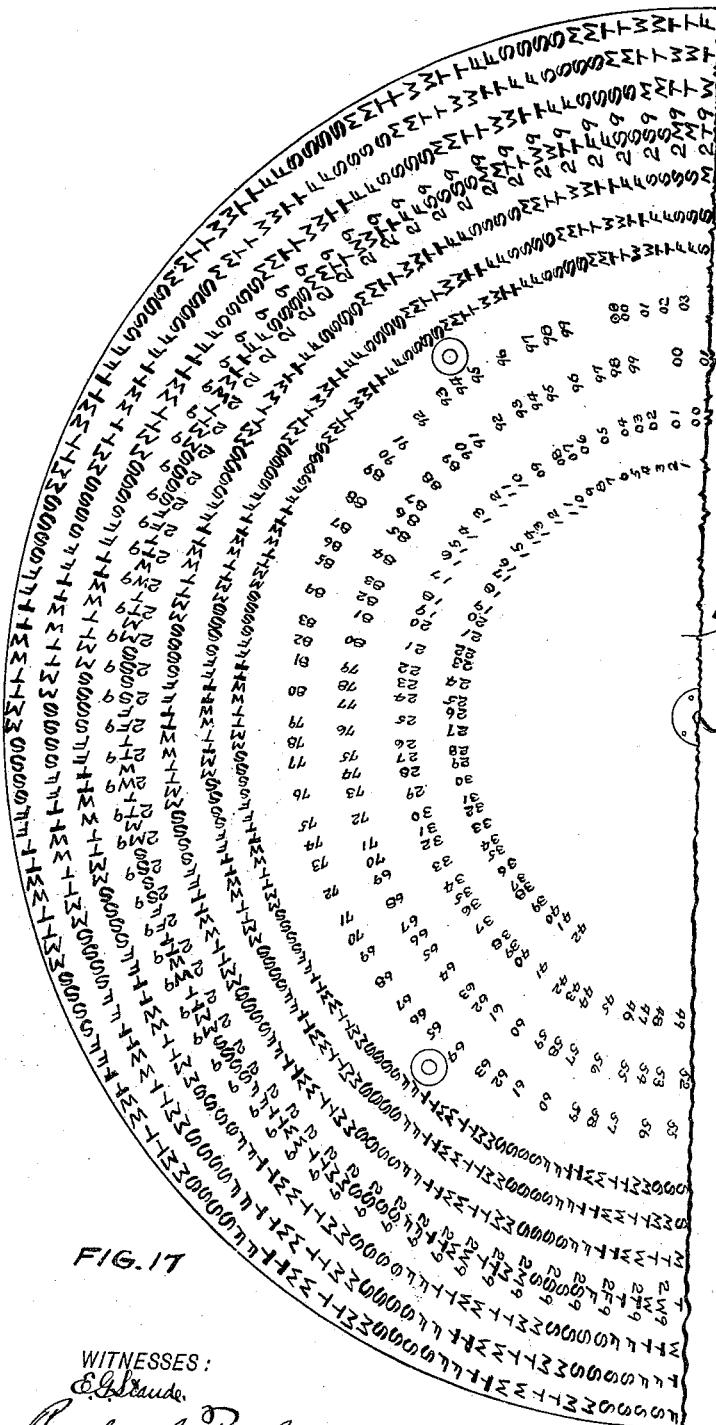
FIG. 17
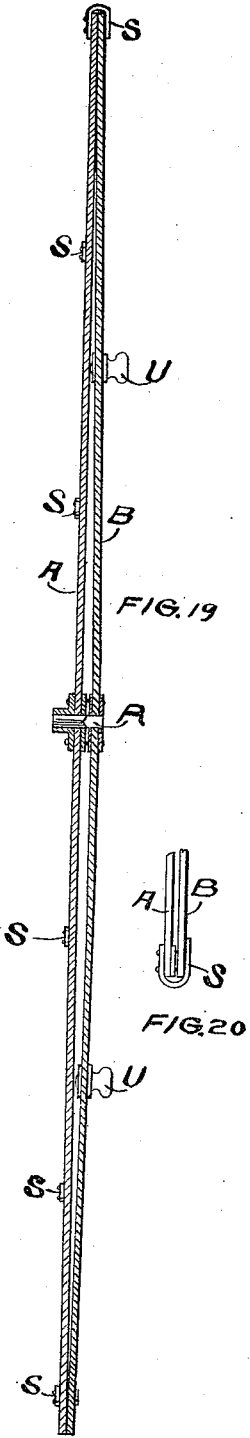
FIG. 19
FIG. 20
WITNESSES:
INVENTOR
SALMON A. BUELL.
BY Paul & Hawley
His ATTORNEYS.

No. 641,433. Patented Jan. 16, 1900.
S. A. BUELL.
ADJUSTABLE PERPETUAL CALENDAR.
(Application filed Dec. 19, 1898.)

(No Model.) 12 Sheets—Sheet 9.

INVENTOR
SALMON A. BUELL

WITNESSES:

BY Paul O Hawley
His ATTORNEYS.

No. 641,433. Patented Jan. 16, 1900.
S. A. BUELL.
ADJUSTABLE PERPETUAL CALENDAR.
(Application filed Dec. 19, 1898.)

(No Model.) 12 Sheets—Sheet 10.

WITNESSES:
INVENTOR
SALMON A. BUELL
BY Paul & Hawley
His ATTORNEYS.

No. 641,433. Patented Jan. 16, 1900.
S. A. BUELL.
ADJUSTABLE PERPETUAL CALENDAR.
(Application filed Dec. 19, 1898.)

(No Model.) 12 Sheets—Sheet 11.

WITNESSES:

INVENTOR
SALMON A. BUELL
BY Paul A Hawley
His ATTORNEYS.

No. 641,433. Patented Jan. 16, 1900.
S. A. BUELL.
ADJUSTABLE PERPETUAL CALENDAR.
(Application filed Dec. 19, 1898.)
(No Model.) 12 Sheets—Sheet 12.

WITNESSES:

INVENTOR
SALMON A. BUELL
BY
His ATTORNEYS.

UNITED STATES PATENT OFFICE.

SALMON A. BUELL, OF MINNEAPOLIS, MINNESOTA.

ADJUSTABLE PERPETUAL CALENDAR.

SPECIFICATION forming part of Letters Patent No. 641,433, dated January 16, 1900.

Application filed December 19, 1898. Serial No. 699,882. (No model.)

*To all whom it may concern:*

Be it known that I, SALMON A. BUELL, of the city of Minneapolis, county of Hennepin, State of Minnesota, have invented certain new and useful Improvements in Adjustable Perpetual Calendars, of which the following is a specification.

This invention relates to calendars, and particularly to perpetual calendars.

The object of my invention is to provide an adjustable perpetual calendar whereby the days of the week and month in any year may be shown.

A further object is to provide an adjustable calendar that is complete for each and any year to which it may be adjusted from B. C. 4999 to A. D. 3599 and which shows both the "old style" and "new style" calculations.

A further object is to provide an adjustable calendar containing corrections of all the errors that have been made in the calculations of time from 4999 B. C. to the present.

A further object is to provide a calendar consisting of two parts relatively adjustable and arranged one upon the other, the first or front part having calendar indications and numbers representing the days of the months for a common year, that are progressively arranged, and other numbers representing the hundreds and thousands of years within the limits of the calendar, that are progressively arranged and provided with openings through which characters, figures, and numbers on the second or back part may be shown and the second or back part having characters representing the days of the week in duplicate sets that are progressively arranged and the figures "2" and "9" for the extra leap-year day (February 29) and numbers representing the units and tens of all years in any century within the limits of the calendar, that are progressively arranged, the indications and characters and figures and numbers on the two parts and the openings on the front part being so arranged relatively to one another that when the two parts are adjusted so as to show the number representing any year within the limits of the calendar at its appropriate opening the calendar will correctly and completely show the days of the week and the corresponding days of the month for that year.

My invention consists generally in an adjustable calendar whereby the days of any year may be determined by the mechanical manipulation of the parts of the calendar and without any resort to independent calculations.

My invention consists, further and particularly, in a calendar comprising two parts, one upon or in front of the other, the front part provided with a face or calendar for a year, save the days of the week and February 29, but in lieu thereof having openings of definite mechanical location with relation to said calendar, and the other or back part bearing mechanically-related representations for the days of the week and for February 29 and for the units and tens of different years, some of which representations appear in the openings of the front part in every adjustment of the back part to correct and complete the calendar for any given year.

My invention also consists in various constructions and combinations of parts, all as hereinafter described, and particularly pointed out in the claims.

The invention will be more readily understood by reference to the accompanying drawings, forming part of this specification, and in which—

Figure 21:
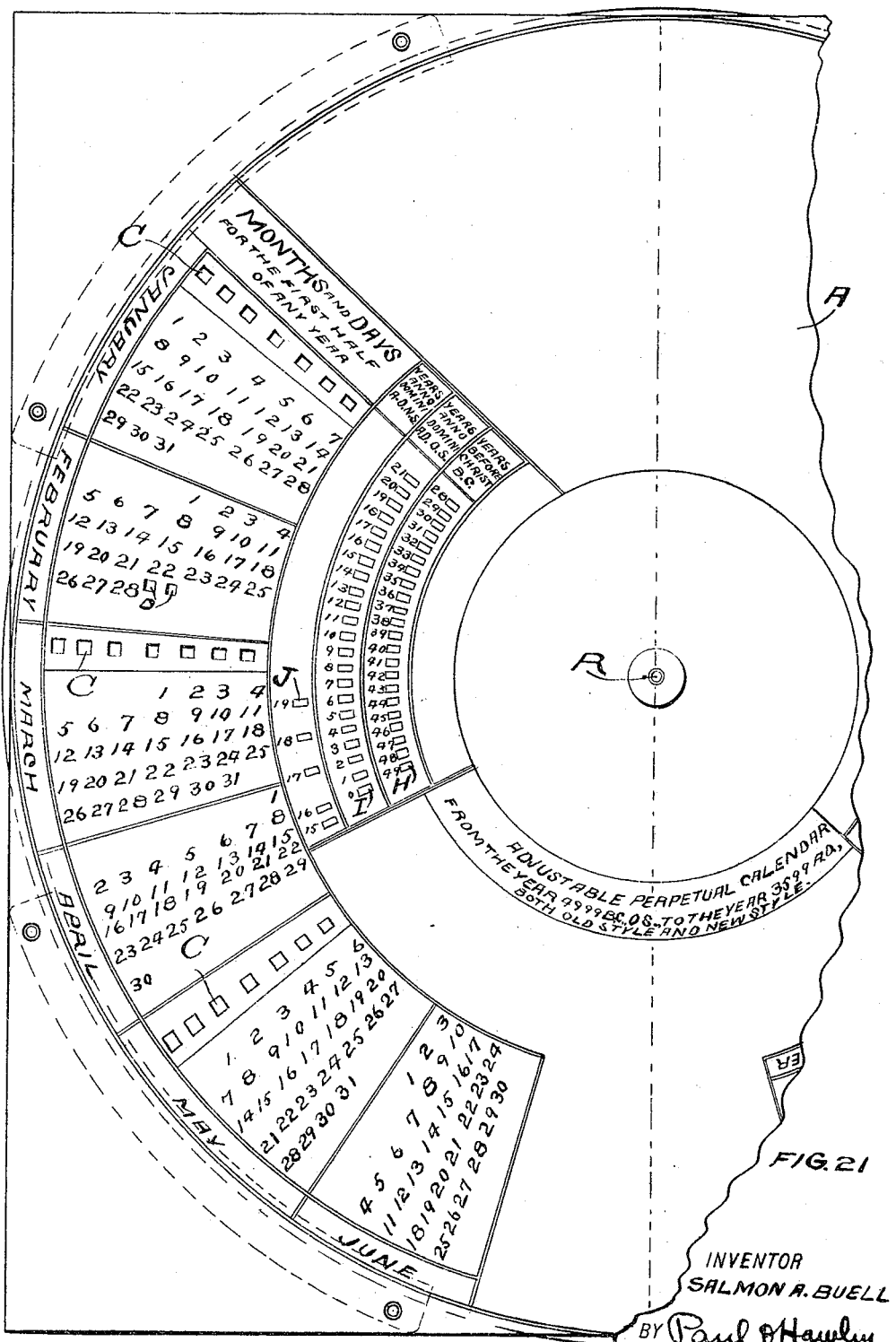
Figures 22, 23:
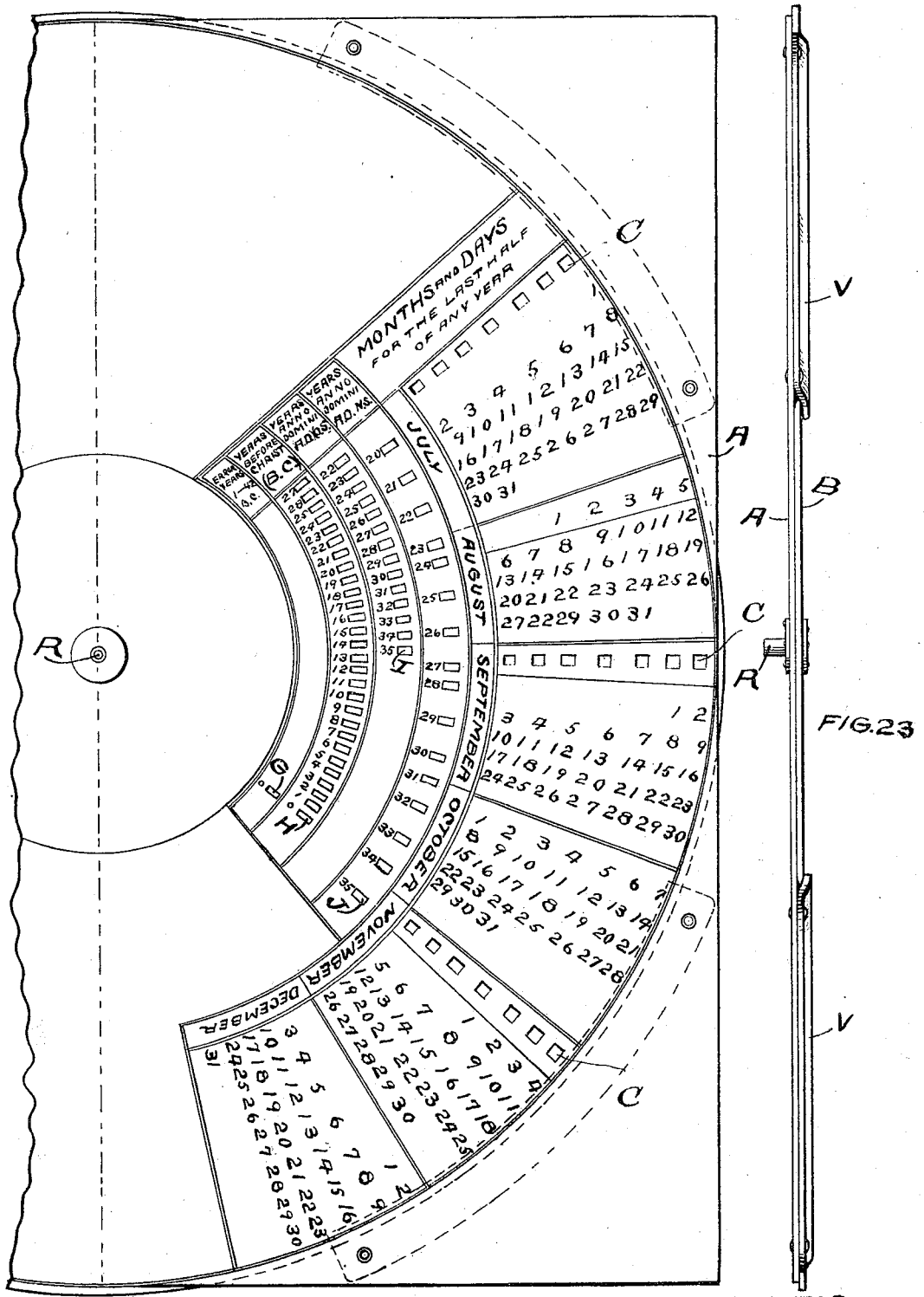
Figure 24:
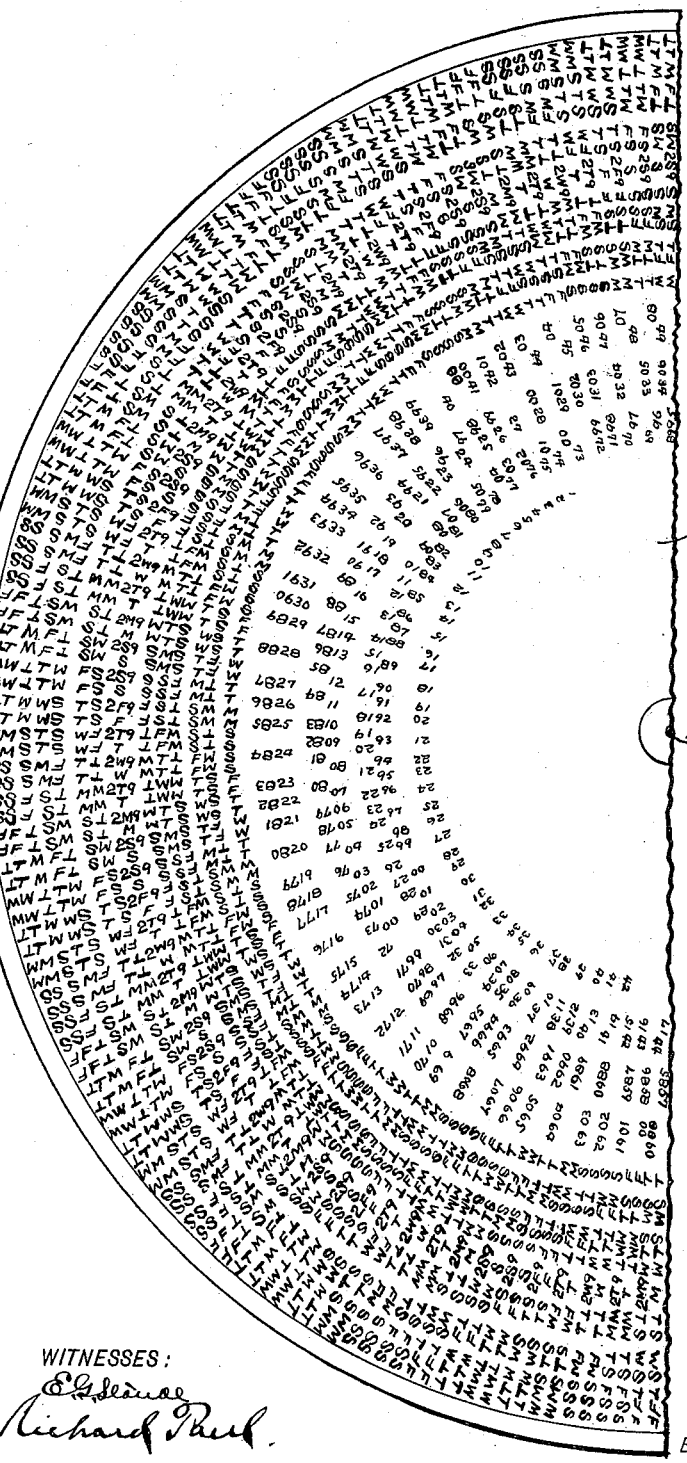
Figure 25:
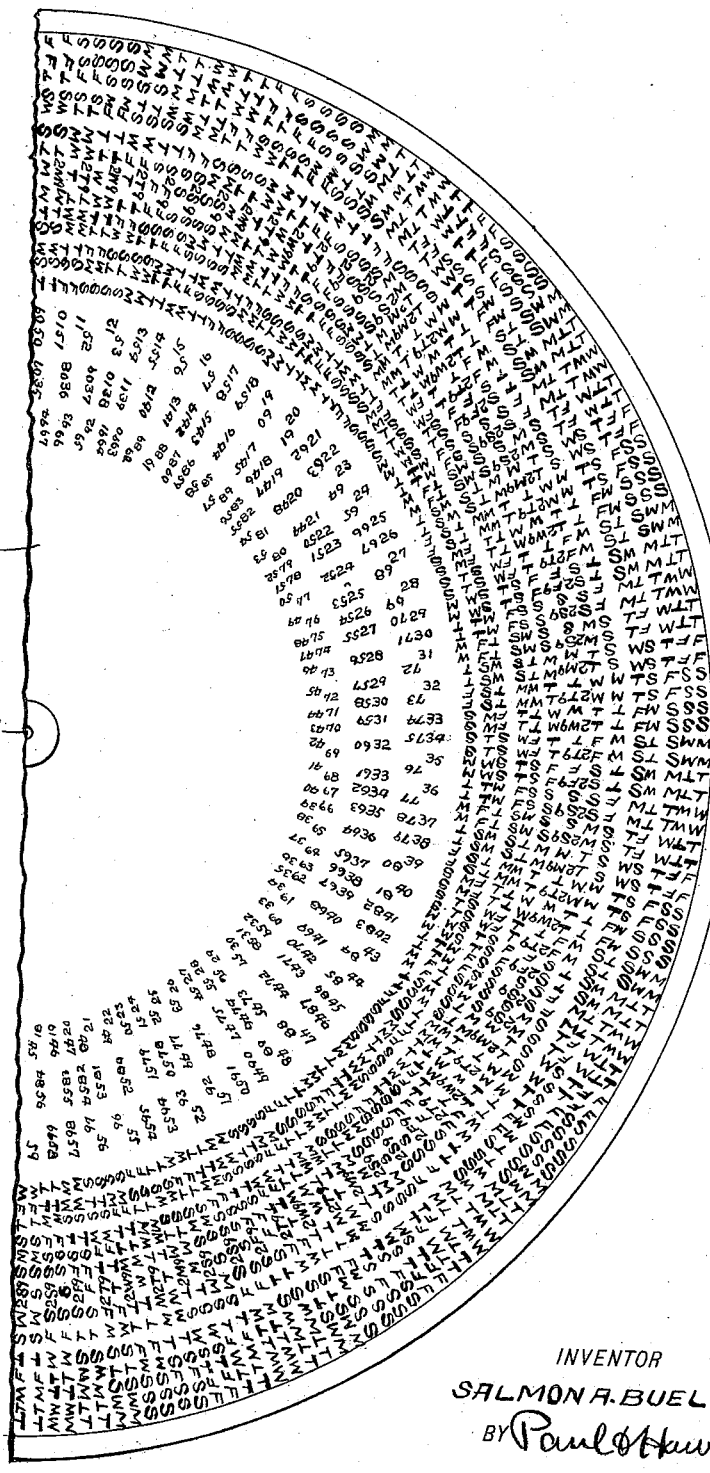

Figure 1 represents the face and front part of an adjustable calendar embodying my invention. Fig. 2 is a view thereof with the front part removed, showing a portion of the back part of the calendar. Fig. 3 illustrates the reverse side of the belt partly shown in Fig. 2 and the remaining portion of the back part of the calendar. Fig. 4 is a vertical cross-section of the device. Fig. 5 is a detail showing the bearing for the lower roll. Fig. 6 is a similar detail illustrating the adjustable bearing for the upper roll. Fig. 7 is a sectional detail substantially on the line $x\ x$ of Fig. 6, the roll being shown in elevation. Fig. 8 illustrates the face and front part of a modified form of my calendar, the same being adapted for the years A. D. 1 to 2099. Fig. 9 is a sectional view on the line $y\ y$ of Fig. 8. Fig. 10 is a cross-section on the line $z\ z$ of Fig. 8. Fig. 11 is a detail of the self-adjusting bearing for the upper roll. Fig. 12 is a section on the line $u\,u$ of Fig. 11. Fig. 13 is an end detail. Fig. 14 represents the face of the back and movable part or belt of the calendar shown in Figs. 8 and 9. Fig. 15 illustrates the face, partly broken away, but leaving the front part of a circular calendar embodying my invention. Figs. 16 and 17 together represent the face of the circular back and movable part or disk that is used in connection with the face-sheet shown in Fig. 15. Fig. 18 is a cross-section of the back and movable part or disk. Fig. 19 is a similar cross-section of the complete calendar of the form that employs the disks shown in Figs. 15 to 18. Fig. 20 is a detail of one of the clips used to hold the movable disk. Figs. 21 and 22 together represent the face and front part of an amplified form of the circular calendar whereon the months and hundreds and thousands of years are divided into separate groups that are progressively arranged. Fig. 23 is an edge view of the same. Figs. 24 and 25 together represent the back and movable part or disk of the calender shown in Figs. 21 to 23, inclusive.

In devising and constructing a perpetual calendar that shall accomplish the objects of this invention there are certain facts in connection with the calculations of time that must be provided for. These I will state, briefly, as follows:

The Christian era, instituted about Anno Domini 527, dates from the birth of Jesus Christ, assumed to have occurred December 25, in the year U. C. (*Urbe Condita*—era of Rome, dating from the foundation of the city) 753; J. P. (Julian period) 4713; J. E. (Julian era) 45, and (Ol. cxciv-4 fourth year of the one hundred and ninety-fourth Olympiad,) and measures time by numbering the calendar years consecutively forward and backward from that event, counting the calendar year next after that day as "Anno Domini (in the year of our Lord) 1," abbreviated "A. D. 1," and the calendar year containing that day, as "Before Christ 1," abbreviated "B. C. 1." The Julian era, instituted at Rome by Julius Cæsar, is the source of the Christian era, and the calendar of the latter, as first instituted, is in length of year and rule of intercalation (three common years to one intercalary or leap year) exactly like the calendar of the former, the year 1 of the Julian era being coincident with the year 45 B. C. of the Christian era.

*The error years.*—In the first thirty-four years of the Julian era, by making the year 1 an intercalary or leap year and only two instead of three common years to each intercalary one, twelve days were erroneously intercalated instead of nine in thirty-three years. To correct this error, the Roman Emperor directed that no other intercalary or leap year should occur until the Julian year 49, (Anno Domini 4.)

*Old style and new style.*—In 1582, Anno Domini, it had been ascertained that the Julian year (adopted as the Christian year) was too long, and in consequence under the rule of intercalation, three common years to one leap-year, the Vernal Equinox in that year had receded to March 11 from March 21, the day it occurred in 325, Anno Domini, the year of the Nicene Council. This misplaced the feast of Easter and all other movable feasts of the church dependent upon its occurrence. To correct this error, Pope Gregory XIII directed that Friday, October 5, should be counted and become October 15, thus eliminating ten days, and to prevent the recurrence of the error he also directed that thereafter a centennial year should not be a leap-year unless divisible by four hundred, while prior to that time, by the rule of intercalation for dates, every year divisible by four was made a leap-year. This change or reformation of the calendar has made two methods of computing time in the Christian era, the one prior to the change herein termed "old style" and the one after "new style." The latter is now used by all civilized nations except Russia and its dependencies and some other countries where the Greek church dominates, which still adhere to old style.

For dates Before Christ old style is used by all countries using the Christian era; but though the rule of intercalation is the same for dates both before and after Christ—three common years for every leap-year—the application of the rule differs in this particular: The first leap-year Anno Domini was the year 4. Hence every year divisible by four was a leap-year; but the year 1 Before Christ is counted as the first leap-year Before Christ. Hence the rule of intercalation Before Christ directs that the year 1 and every year succeeding in numerical order a year divisible by four shall be a leap-year. This would make the year 45 Before Christ a leap-year, as it was by the Julian calendar, of which it was the year 1. Between the year 42 Before Christ (Julian year 4) and the year 1 Before Christ, both inclusive, the error years must be used if exactness be required in the computation of time.

The calendar which I have devised provides for all of the changes and errors hereinbefore pointed out and shows also both old-style and new-style calculations.

With this preliminary explanation I will now describe the construction, arrangement, and mode of operation of my calendar, as illustrated in the accompanying drawings.

The back part of the calendar theoretically is divided into two hundred and fifty-two equal spaces by imaginary equidistant horizontal straight lines in that form of the calendar having a belt for the back part and by imaginary equidistant radii from the center of the disk in that form having a disk for the back part. These spaces are subdivided in the belt form by imaginary vertical straight lines and in the disk form by imaginary circumferences with different radii from the center of the disk. In making these subdivisions the space between any two adjoining vertical straight lines or circumferences will be suited to the lateral size of the character or figure to be used. The front part in each form of the calendar must be made into like subdivisions and by the same means, respectively, so that when the parts of the calendar are in proper relative position the vertical straight lines in the belt form and the circumferences in the disk form upon the front part will coincide with those upon the back part. For convenience I shall use for "spaces" the words "rows of subdivisions." If this coincidence of the vertical straight lines in the belt form and of circumferences in the disk form of the calendar be continuous during movement of the back part it follows mechanically in the belt form that whenever by such movement a horizontal straight line upon the back part is passed under a like line on the front part the two straight lines will coincide, and at the same time every other horizontal straight line on the front part will coincide with a like line on the back part, and it results also in the disk form that whenever by such movement a radius upon the back part is passed under a radius on the front part the two radii will coincide, and at the same time every radius upon the front part will coincide with a radius upon the back part. Therefore whenever one subdivision on the back part passes under a subdivision upon the front part there will be a moment when the boundary-lines of the subdivision on the front part will coincide with the boundary-lines of the one on the back part, and at that moment the boundary-lines of every subdivision on the front part will coincide with the boundary-lines of a subdivision on the back part. Each character or figure must be placed as near as may be in the center of its subdivision, leaving sufficient space around it and within the boundary-lines of the subdivision to make the character or figure clearly and distinctly apparent. This rule when applied to the front part has some exceptions, which will be hereinafter noted as they occur. Each opening in the front part should eliminate the whole of the subdivision within the boundary-lines, so that the corresponding subdivision with its occupying character or figure upon the back part will appear through the opening as if upon the front part, and when two figures are to appear at any opening it should eliminate both the corresponding subdivisions from the front. In construction these subdivision boundaries may be drawn in pencil on both parts and should be finally erased from the back part, though to a certain extent made permanent on the front part.

In all the figures A represents the front part of the calendar, and B the back part. These parts are adjustable relatively to each other, and they may be of rectangular, circular, or other preferred form, and may be adjusted by moving one longitudinally under or over the other, as shown in Figs. 1 to 14, herein designated the "belt" form of the calendar, or by arranging both on a common axis or center, and thereby turning one on the other, as shown in Figs. 15 to 23, herein designated the "disk" form of the calendar. In the belt form the two rollers L L and L L, which carry the belt, have a collar at each end (See Figs. 4 and 7) which prevent any sidewise motion of the belt. This will secure the necessary continuity of coincidence of the vertical straight lines upon the front part with those on the back part; and it is self-evident that in the disk form the adjustment and turning of the back part upon the common center will secure the necessary continuity of coincidence of the circumferences upon the front part with those of the same radius upon the back part. The front part A has in each instance printed or marked thereon the names of the months and appropriate groups of figures or numbers representing the days of each month (except the 29th of February) that are progressively arranged. These groups may be arranged in a single column, as shown in Fig. 1, in two columns, as shown in Fig. 8, in a single curved column on the circular form of calendar, as shown in Fig. 15, or in two curved columns, also in the circular form, as shown in Figs. 21 and 22, or in any other preferred number of groups or form of column of groups. The numbers representing the days of the month are arranged in horizontal or radial rows, seven in each complete or full row, thereby providing for the seven days of the week and creating seven columns of month-day figures in each column of groups, and it will be noted that where there are in any month a number of days constituting part of a week the first number of the next succeeding month is arranged in the next succeeding column of month-day figures and in the row of subdivisions selected for the first row of month-day figures in the group for the next succeeding month. In arranging these groups of month-day figures, however, an exception is preferably made to the rule requiring each character or figure to be placed in the center as near as may be of its subdivision. The figures in the first, second, third, fifth, sixth, and seventh columns of month-day figures use each three horizontally or radially adjoining subdivisions and the figures in the fourth or center column use five such adjoining subdivisions. In arranging these groups still another exception to this same rule is preferably made, particularly in the form of calendar shown in Figs. 21 and 22, and in any other form, if desirable or preferable—that is, two or more adjoining horizontal or radial rows of subdivisions may be used for the month-day figures. The number of subdivisions permissible under this second exception will, however, be limited and governed by the location of the openings in the front part for the weekday characters on the back part, as will be hereinafter explained. By the first exception room is made in the fourth column of month-day figures for the openings in the front part for the figures "2" and "9" on the back part to complete the month of February on the front part in leap-years, and by both exceptions the month-day figures can be made much larger, as they occupy a group of adjoining subdivisions three wide and two or more high, for in the fourth column of month-day figures this group of subdivisions is limited to the three central ones horizontally or radially in the column. When two figures compose the month-day number, they occupy so much of their group of subdivisions as possible and still give the number a clear and distinct appearance, and when but one figure in the month-day number it occupies a like portion of the right-hand half of its group of subdivisions. For instance, it will be noted that the figure "1" to represent the first day of January is placed in the first column of month-day figures. This brings the "31" in the third column and fifth row of month-day figures. The figure "1" to represent February 1 is then placed in the next succeeding column of month-day figures and in the row or adjoining rows of subdivisions selected for the first row of month-day figures in the group for that month, and this system is followed, it will be noted, through all the forms of the calendar. A horizontal or radial row of seven openings C is provided in the part A, each eliminating therefrom one subdivision—viz., the central one in the column of month-day figures in which it is placed and preferably above every second month. In the circular form of the calendar these openings are arranged in radial lines instead of horizontal, as shown in Figs. 15, 21, and 22. These openings are arranged above the group of figures representing every second month, for the reason that the same characters are to appear at each row of openings for the common years, while for leap-years the characters that appear at the last five rows of openings are alike, but differ from those that appear at the first row. I arrange these openings C so that the distance vertically between the first and second rows of openings C is fourteen rows of subdivisions and between any other two rows of openings C thirteen rows of subdivisions. This applies to all the forms of the calendar, except the form shown in Figs. 21 to 25 of the drawings, in which last-mentioned form the distance vertically between the first and second rows of openings C is twenty-six rows of subdivisions and between any other two rows of openings C twenty-seven rows of subdivisions. The reason for the increase of space between the rows of openings C on this form of the calendar is to give space for making larger month-day figures on the part A. It will be noticed that double space is used on the front part A for the month-day figures and that the spaces between the first and second rows of openings C are one less than between the others instead of one more as in the other forms, the reasons for which will be hereinafter set forth.

In the column of month-day figures following February 28 I provide two openings D, each eliminating one subdivision from part A, which permit the figures "2" and "9" (for February 29) on the back part B of the calendar to be shown through the front part A. These openings are arranged in the same horizontal or radial row as the figures "26," "27," and "28," and the uncut space between the openings is arranged in the same vertical or curved column of subdivisions in which is placed the middle opening C in each row of such openings. There is a slight modification of the arrangement of the openings D in the part A shown in Fig. 21. In this the openings are placed in the upper horizontal or radial row of subdivisions of the two occupied for the last row of month-day figures in the group for February. This is because the figures "2" and "9" on the part B occupy but one subdivision each. I also provide in the part A of the complete calendar four columns of openings G H I J, which columns are vertical in the belt form (see Fig. 1) and curved in the disk form of the calendar. (See Figs. 15, 21, and 22.) Each of these openings eliminates from the part A two subdivisions horizontally or radially adjoining. There is but one opening G arranged at the foot of the column, having before it the figure "0." (See Figs. 1, 15, and 22.) This is used for the years from 1 to 42 Before Christ to correct the error hereinbefore explained in the Julian era. In the next column there are fifty openings H, having before each one of the numbers "0" to "49," used to represent the hundreds and thousands, as required in the number representing any year from 1 to 4999 Before Christ. These numbers are arranged in order from the bottom to the top of the column or run up. The openings I are thirty-six in number and have before them the numbers "0" to "35." These are for the years 1 to 3599 Anno Domini, old style. The openings J have before them the numbers "15" to "35," both inclusive, and are twenty-one in number, and they are for the years 1582 to 3599 Anno Domini, new style. The numbers for the openings I and J are in the reverse order from the numbers for the openings H. In the amplified disk form of calendar shown in Figs. 21 to 23 the openings H, I, and J are each placed part in one and part in the other of two curved columns on opposite sides of the center. The openings H, preceded by the figures "0" to "27," both inclusive, are upon the right side of the center and the remainder on the left. The openings I, preceded by the figures "0" to "21," both inclusive, are upon the left side of the center and the remainder on the right. The openings J, preceded by the figures "15" to "19," both inclusive, are upon the left side of the center and the remainder on the right. This arrangement is for convenience and does not affect the operation of the device. The openings G and H are omitted from the modified belt form of calendar shown in Figs. 8 to 14, which is for the period Anno Domini only. In this form the openings I are arranged in five vertical columns side by side on the upper and central portion of the part A. In the four left-hand columns the openings are preceded by the figures "1" to "14," both inclusive, and in the right-hand one by the figures "2" to "15," both inclusive. The first left-hand column is used for the years 1 to 28, both inclusive, and the next to the right is for the years 29 to 56, both inclusive, and the next to the right for the years 57 to 84, both inclusive, and the next to the right for the years 85 to 99, both inclusive, in any century, and the right-hand column for centennial years, all old style Anno Domini. The openings J are arranged in five vertical columns side by side on the lower and central portion of the part A. In the two left-hand columns the openings are preceded by the figures "14" to "20," both inclusive, and the two next columns to the right, which extend one opening higher than the preceding two columns, by the figures "15" to "20," both inclusive, and the right-hand column (which does not extend as far down by one opening as the other columns) by the figures "16" to "20," both inclusive. These five columns are used respectively for the same years in the century as the columns containing the openings I, but only for years new style to the year 2100, exclusive, the first day of new style being Friday, October 15, 1582. This peculiar arrangement of the openings I and J is done to condense this form of the calendar and have it occupy as little space as possible, and I am enabled to do this because within every century a cycle of twenty-eight years returns January 1 of the twenty-ninth year to the same day of the week as January of the first year of the cycle—that is, if in any century January 1 of the year 1 falls upon Saturday then January 1 of the years 29, 57, and 85 will fall upon Saturday, and if January 1 of the year 2 falls on Sunday then January 1 of the years 30, 58, and 86 will fall upon Sunday, and so on through each cycle to and including the last year of the century. By arranging the month-day figures, together with their accompanying openings C for the week-day characters, in two columns of six groups each, one column for the months in the first half of the year on the left side of part A and one column for the months in the last half of the year on the right side of part A, this form of the calendar is very much condensed in area, and as another result the belt part B need be but one hundred and twelve subdivisions in net length after joining the ends.

It will be noted that on each form of the calendar the openings H and I for the years old style, both Before Christ and Anno Domini, are arranged in regular succession, the distance between any two openings being one row of subdivisions, while the openings J for the year's new style are arranged as follows: (Beginning, for instance, with the opening before which appears the number "15") there is one row of subdivisions between the opening "15" and the opening "16," three rows of subdivisions between the opening "16" and the opening "17," three rows of subdivisions between the opening "17" and the opening "18," three rows of subdivisions between "18" and "19," one row of subdivisions between "19" and "20," and so on. One reason for this is that, as stated before, in the old style computation every fourth year is a leap year, while in the new style the leap years occur in every year that is divisible by four, except the centennial years, and in every centennial year that is divisible by four hundred.

Referring now to the back part B of the calendar, which may be designated as the "movable" part, (though the front part may be made to move while the other part remains stationary,) it will be observed that it must be provided with a series of figures or numbers running from "00" to "99," both inclusive, to be shown at each of the series of openings H, I, and J, and with a similar series from "1" to "42," both inclusive, to be shown at the opening G, with letters or characters designating the days of the week to be shown at the openings C, and with the figures "2" and "9" to designate the 29th day of February or extra leap-year day to be shown, the "2" at the left-hand, and the "9" at the right-hand, opening D.

The arrangement of the days of the month on the part A of the calender as above explained divided the months into weeks, January 1 being the first day of its week. This places February 1 on the fourth day of its week and brings the 29th of February on the fourth day of its week. The figures "2" and "9" must be placed with the fourth day of the week in the series or column of "week-day" (which term includes Sunday) characters upon the movable part B of the calendar, and these figures appear at openings D for and only for each leap-year.

In several particulars now explained there is preferably a difference between the amplified disk form of the calendar shown in Figs. 21 to 25, both inclusive, and all the other forms shown in Figs. 1 to 20, both inclusive. Because this amplified disk form has half the months and part of the figures designating the centuries, with their accompanying openings, in curved columns on or in each side of the center of part A, it becomes necessary to duplicate every character and figure upon part B, (except those for the error years and the figures "2" and "9," which apply only to February on the left side.) This is evident for the reason that the characters and figures on part B to appear at the openings in the left side of part A would be inverted on the right side and those to appear at the openings in the right side would be inverted on the left. In order to make this duplication, the characters and figures and openings upon the left side of part A are thrown nearer the center than those on the right side by the width of the curved column of subdivisions used for the names of the months on the left side of part A, and necessarily the characters and figures upon part B to appear at the openings on the left side of part A are placed in curved columns of subdivisions a like distance nearer to the center of part B than those to appear at the openings in the right side of part A. It will be noted also that the characters and figures upon part B to appear at the openings in the left side of part A are preferably progressively arranged to read upward, except the figures to designate years in a century Before Christ, which are arranged to read downward, and that the characters and figures upon part B to appear at the openings in the right side of part A are preferably progressively arranged to read downward, except the figures to designate years in a century Before Christ, which are arranged to read upward. It will be noted also in this form (shown in Figs. 21 to 25, both inclusive) that preferably the figures "2" and "9" on part B accompany the week-day character for the fourth day of the week, the "2" being on the left and the "9" on the right in the second set of the duplicate sets of the week-day characters, and that this set is used for January and February in the leap-years.

Now referring to the other forms of the calendar shown in Figs. 1 to 20, both inclusive, in regard to the foregoing particulars, it will be noted that there is no duplication of the characters or figures upon the part B and that preferably they are progressively arranged to read downward, except the figures to designate the years of a century Before Christ, which are arranged to read upward, and that preferably the figures "2" and "9" so accompany the week-day characters for the fourth day of the week of the first set of the duplicate sets of week-day characters, and that this set is used for March and subsequent months in leap-years. These different uses of the set of week-day characters having the figures "2" and "9" therein are governed by the relation of the openings D for the 29th of February to the openings C for January and February.

The rows or sets of the week-day characters upon the part B of the calendar read from left to right in the order of the days of the week, and in the same order are progressively arranged in series of fourteen rows or sets each, the first and second rows or sets and every succeeding pair of rows or sets being a duplication of the same week, save the use of the figures "2" and "9" therewith, as hereinbefore explained. Each of the seven weeks thus duplicated in each series has for its first day a different but next successive day of the week, reading as they are progressively arranged. Therefore between the second row or set of any of the duplicate sets in one series and the second row or set of the duplicate sets of the same week in the next series there must be thirteen rows of subdivisions, and between the first row or set of any of the duplicate sets in one series to the second row or set of the duplicate sets of the same week in the next lower series there must be fourteen rows of subdivisions.

As has been hereinbefore stated, I use on the part A between the first and second rows of week-day openings C fourteen rows of subdivisions, and between any other two rows of week-day openings C thirteen rows of subdivisions, except in the disk form of the calendar shown in Figs. 21 to 25, both inclusive, in which form I use on the part A between the first and second row of week-day openings C twenty-six rows of subdivisions, and between any other two rows of week-day openings C twenty-seven rows of subdivisions.

For common years the same week must appear in all the rows of week-day openings C in the three forms of the calendar shown in Figs. 1 to 20, both inclusive. Hence for January and February the first set of the duplicate sets of the given week in the series used will appear in the first row of week-day openings C and the second set of the duplicate sets of the same week in the next lower series will appear in the second row of week-day openings C for March and April, and the second set of the duplicate sets of the same week in the next lower series will appear in the third row of week-day openings C for May and June, and so on, the second set in each case will appear in the fourth, fifth, and sixth rows of week-day openings C; but for leap-years in the same forms of the calendar the second set of the duplicate sets of the given week is used for January and February. Hence the first set of the duplicate sets of the next succeeding week in the next lower series will appear in the second row of week-day openings C for March and April. This will cause March to commence one day later than in a common year, and will give room for the 29th day of February, which will fall upon the mid-week-day of the week in the second series, exactly like that week in the first series, which appears for January and February in the first row of openings C; but as the figures "2" and "9" are found only in the first set of the duplicate sets the openings D for such figures will each eliminate from the front part A one subdivision in the thirteenth row of subdivisions below the first row of openings C. The figures "2" and "9" accompany the week-day character in the fourth column of week-day characters on the movable part B, thus: The "2" is before and the "9" after such character. Hence the openings D in the part A are separated only by the subdivision on part A corresponding to the subdivision on part B occupied by such week-day character, and said character is hidden by said intervening subdivision on part A. In the disk form of calendar shown in Figs. 21 to 25 the figures "2" and "9," as before stated, appear only with the column of week-day characters upon part B used for the left-hand side of part A, because February is on that side of the calendar, and will each eliminate from part A one subdivision in the twenty-second radial row of subdivisions below the first radial row of openings C. This arrangement on part B of the week-day characters in series of fourteen, composed of seven duplicate sets of seven days each that are progressively arranged in the order of the week-days, both as to the days in each of the duplicate sets and as to the character commencing each set of the duplicate sets themselves, one character of one set of the duplicate sets being accompanied by the figures "2" and "9," as heretofore described, is the basic construction of my calendar, the arrangement of the years upon the movable part B and of the face A of the calendar being built thereon. By reference to the drawings it will be noticed that in the principal columns upon the movable part B the years are arranged for a complete century and are divided into groups of four, each figure in the fourth number in each group being separated from the remainder of its own group and from the next group by an additional subdivision. In explanation of this, which is the second important feature of my invention, I may say that in the Christian era as originally instituted and in which the calculation of time is termed "old style" each calendar century consists of seventy-five common years and twenty-five leap-years, which are separated into twenty-five series of four years each, the first three years of each series being common years of three hundred and sixty-five days and the fourth a leap-year containing three hundred and sixty-six days. As a common year contains or is made up of fifty-two weeks and a day, it follows that it begins and ends upon the same day of the week. As a leap-year contains fifty-two weeks and two days, it follows that it commences upon one day of the week and ends upon the next. Therefore such a four-years' series must commence upon one day of the week and end upon the fourth succeeding one, or, in other words, five succeeding days of the week are used for the first and last days of the four years of each four-years' series. As before stated, the two kinds of years, common and leap years, are represented in the week-day column upon the movable part B by the two forms of the same week distinguished by the figures "2" and "9." One form of week must be used for a common year. Therefore for the next common year it is necessary to skip the other form of the same week and place each figure used in designating such common year on a subdivision in the second succeeding horizontal or radial row of subdivisions occupied by that form of the next week used for a common year. Thus in each group of three common years the figures will be separated by single subdivisions. Therefore only alternate sets of week-day characters as arranged upon the calendar are used for common years. Hence if the year 1 of any century is so placed as to be on a subdivision in the same horizontal or radial row of subdivisions with the form of week used for common years commencing with the same day of the week as that year the year 2 will have to be placed on a subdivision in the second succeeding horizontal or radial row of subdivisions in order to be opposite a form of week used for common years commencing with the succeeding day of the week, and the year 3 on a subdivision in the next succeeding second horizontal or radial row of subdivisions for the same reason; but as the year 4 is a leap-year and must use the other form of week commencing with the succeeding day of the week it must be advanced one horizontal or radial row of subdivisions, and hence must be placed upon the third succeeding horizontal or radial row of subdivisions. This is because the week-day characters used for January and February in common years are the same set of the duplicate sets. As the second succeeding horizontal or radial row of subdivisions contains week-day characters for the week to be used for January and February of a common year, the third succeeding horizontal or radial row of subdivisions contains the week-day characters to be used for January and February of the next succeeding leap-year. As this leap-year ends with the day of the week next succeeding the one upon which it begins, the two forms of the week commencing with that day are appropriated in completion of that leap-year, and the year 5, which commences with the second succeeding day and is the first year of the second four-years' series, must therefore be placed upon the third horizontal or radial row of subdivisions succeeding the one upon which the year 4 was placed, because the year 5 is a common year and must use the same set in those duplicate sets as had been used before for common years in their respective duplicate sets. Thus it will be seen that for each four-years' series ten rows of subdivisions have been used and that the same number must be used for each of the twenty-five four-years' series in the century. This makes two hundred and fifty rows of subdivisions necessary upon the movable part B for the one hundred years of any century; but two hundred and fifty is not a multiple of fourteen, which is the series of weeks used. Hence two hundred and fifty-two, the next multiple of fourteen, is the number of rows of subdivisions necessary in order to use this series of week-day characters repeated continuously upon a belt or disk, the two extra rows of subdivisions being expended between the "99" and the "00" upon the back part B.

In the foregoing I have referred particularly to the old style, which will be more easily understood by reference to the column of years next to the right-hand column on part B in Figs. 2 and 3. The column of years next to the left-hand column on part B (see Figs. 2 and 3) comprises the years old style Before Christ, in which the year 1, together with every year next succeeding in numerical order or any year that is divisible by four is a leap-year. The left-hand column of years upon the movable part B, Figs. 2 and 3, comprises the first forty-two years preceding the Christian era, in which period, because of erroneous intercalation, the leap-years were incorrectly numbered. This column gives those forty-two years Before Christ as actually measured for leap-years under that error. The right-hand column of years upon the movable part B, Figs. 2 and 3, comprises the years in a century new style, which do not correspond in position to years old style by reason of the ten days, error occurring up to the sixteenth century corrected by making Friday, the 5th day of October, 1582, old style, the 15th day of October, the new style starting from that day; but in their numerical order and relation to each other they are exactly the same as the years in the old style column. The right-hand column before referred to will be found to contain two pairs of zeros, the first pair in order of numbers in this column being used for centennial leap-years and the other pair for the centennial common years new style. In new style only such centennial years as are divisible by four hundred are leap-years, and in Figs. 2 to 17 and 24 I have distinguished by color or shading between the pair of zeros employed for centennial leap-year dates and centennial common-year dates, and it will be noted that there is but one row of subdivisions between the year 1 and that pair used for common-year dates, while there are two rows of subdivisions between the year 1 and that set used for leap-year dates. It will be noted that in the belt form of the calendar shown in Figs. 8 to 14, both inclusive, only the Christian era to the year 2099 is used and that on part A (see Fig. 8) the centuries are repeated in five columns placed between the two columns of groups of the months, the first six on the left and the last six on the right side, and that on part B (see Fig. 14) the years in the century are grouped in five columns, the years from 1 to 28, both inclusive, in the first column and the years 29 to 56, both inclusive, in the second column, (next to the right,) and the years 57 to 84, both inclusive, in the third, and the years 85 to 99 in the fourth, and the "00" for the centennial year in the fifth, and that these five columns of years in a century are placed between the two columns of duplicate sets of week-day characters alike on each side, except that the figures "2" and "9" accompany the mid-week-day character on the left side, because February is placed on that side of part A. Much of this has been described before, but is repeated here because of its contrast with what has just been said of the belt form of the calendar shown in Figs. 1 to 7. It will be noted also that in the two disk forms of the calendar shown in Figs. 15 to 25 the description just made of the belt form of calendar shown in Figs. 1 to 7 will be applicable to these two disk forms, if referring to the center of the disk "inner" be used for "left hand" and "outer" for "right hand." It will be noted also that on the movable part B, Figs. 2, 3, 14, 16, 17, 24, and 25, the numerical order of the numbers comprising the years in the old style and new style columns Anno Domini are the reverse of the numerical order of numbers comprising the "error years" and old style years Before Christ, and that the order of the duplicate sets of the week-day characters correspond to the numerical order of the columns of the years both old style and new style Anno Domini.

The face or front part A of the calendar, as before stated, has columns corresponding to the year-columns upon the back or movable part B. The face or front part A is measured or divided into rows of subdivisions that are identical in size with the corresponding rows of subdivisions on the movable part B. In the old style columns the openings in part A through which the units and tens figures upon the movable part B show are placed one horizontal or radial row of subdivisions apart, such being the distance between common-year numbers upon the movable part B. The elimination of the 29th of February from every centennial year, new style, not divisible by four hundred renders a different arrangement necessary in the new style column upon the face or part A of the calendar.

The forms of the calendar shown in Figs. 1 to 7 and that shown in Figs. 15 to 20 are alike in the application of the principle of construction, except that one has an oblong front and uses a belt for the back part, while the other is circular and uses a movable disk of the same size for the back part, the mechanical movement requisite to adjust the calendar being produced (in one case) by turning a roller which carries the belt and in the other case by turning the back disk upon the center of the two parts. In mechanical movement the form shown in Figs. 21 to 25 is like the form shown in Figs. 15 to 20, but differs in some other respects from either of the other forms.

Again taking up the front part A of the form shown in Figs. 21 to 25 and repeating somewhat in this connection for greater clearness, it will be seen that the months for the first half of the year appear upon the left-hand side of the calendar, while the months for the last half of the year appear upon the right-hand side; also, that the first five centuries Anno Domini, new style, the first twenty-two centuries Anno Domini, and the last (in order of numbers, but first in order of time) twenty-two centuries Before Christ appear upon the left-hand side, while the last sixteen centuries Anno Domini, new style, the last fourteen centuries Anno Domini, old style, and the first (in order of numbers, but last in order of time) twenty-eight centuries Before Christ, and the error years—that is to say, the first forty-two years Before Christ—all appear on the right side. It will be seen also that thus dividing the months and the centuries on the part A necessitates the duplicating of the week-day characters and the year-numbers (save those for the error years and the figures for February 29) upon the part B. It will also be seen, observing the two outside columns of week-day characters, that the week-day sets for the left-hand months begin with the same week-day that the week-day sets for the right-hand months end with in the same duplicate sets, and that these sets run out or from the center for the right-hand months and in or toward the center for the left-hand months, and that the last column of characters for the former is outside of the first column of characters for the latter. This necessitates on the front part A the throwing in (with reference to the center) of the left-hand-month figures and the throwing out of the right-hand, occupying the outside curved column of subdivisions by the names of the left-hand months and the inside curved column of subdivisions by the names of the right-hand months. The figures for centuries on the front part A have their respective openings for years in any century toward the center on the left-hand side and from it on the right-hand side in relation of the openings to their respective century figures. This permits the duplicate column of years in any century upon the movable part B used for the left-hand century years on the front part A to pass under the column of the same style right-hand century years on the part A and of course be hidden on the right-hand side, and vice versa. It should also be noted in this disk form that the columns of years on the back part B do not bear the same relation to each other in regard to their beginnings and endings, though the four-years' series in each column are arranged in the same way as in the other forms of the calendar. It will also be noted that these columns of years on the back part B used for the left-hand side of the calendar do not stand in the same relation to the week-day characters as upon the other forms, nor do the same columns of years on the right-hand side. Looking at the other forms shown in Figs. 1 to 20 it will be seen that "01" in old style Anno Domini is placed horizontally or radially opposite the first set of the duplicate sets of week day characters commencing with Saturday, and in new style Anno Domini horizontally or radially opposite the first set of the duplicate sets of week-day characters commencing with Wednesday. The former was the week-day upon which January 1, old style Anno Domini 1 fell, and the latter would be the day should we run back new style to January 1 Anno Domini 1 from Friday, October 15, new style Anno Domini 1582. It will be seen also that Before Christ 01 is horizontally or radially opposite the first set of the duplicate sets commencing with Thursday, which is correct if the "error years" be disregarded. It will be noted also in connection with this that Before Christ 01 is a leap-year, which is also correct if the error years be disregarded, and by the rule for Anno Domini should be horizontally or radially opposite the second set of the duplicate sets of the week-day characters; but this rule is reversed for Before Christ, because the calendar years run the other way, or against time instead of with it.

Now returning to the form shown in Figs. 21 to 25 it will be noticed that the greater portion of the part A is placed in the lower half of the circle and that "15" of new style is not radially opposite to "15" of old style. This is done to make more room at the top of the calendar, which may, if desired, be used for advertising. All this is possible, because the sets of duplicate sets of week-day characters on part B are progressively arranged in series of fourteen. Hence one series can be taken as well as another, as all else is made to accord with the change. In this same form, Figs. 21 to 25, the row of week-day openings C for May and June on the part A are on the twenty-eighth radial row of subdivisions below that for March and April, and the same is true of any subsequent two months. The reason of this is again because of this series of fourteen. I simply extend the number of radial rows of subdivisions on the part A used for the month-day figures of a month and use one series on the back part B for each month instead of one for every two months, and hence I could, if desired, have a row of week-day openings for every month.

In order to make the month-day figures larger upon the calendar, I can use one or more series of week-day characters on the back part B to each month on the front part A, and taking the months by pairs I can use any number of series to a pair, but can only have six rows of week-day openings when I use an odd number of series to the pair, while if I use an even number of series to the pair I can always have twelve rows of week-day openings.

In the form shown in Figs. 21 to 25 it should also be noted that the row of week-day openings for January and February is on the twenty-seventh radial row of subdivisions above that for March and April, or a less distance than between any other two rows of week-day openings on this part A, while in the other forms of the calendar this distance is greater than between the other rows on the part A. One reason for this is that these two have to move or read upward instead of downward, as the right-hand ones do in this form and as all do in the other forms. The February 29 openings D are in the fifth radial row of subdivisions above the row of week-day openings for March and April in part A. This is because, first, double the number of radial rows of subdivisions on part A are used for the month-figures, and, second, because single radial rows of subdivisions on the movable part B are used for each set of the week-day characters. Therefore four such rows of subdivisions on part A are used for the doubling of the month-figure space, and I use the fifth row to get to the right set of the duplicate sets on part B containing the "2" and the "9." It is also to be noted that on the left-hand side of this form the week-day row of openings for January and February for common years uses the set of the duplicate sets of the week-day characters without the "2" and the "9," and the week-day rows of openings for the other months use the ones with the "2" and the "9," and the reverse with the leap-years. One reason for this is that this left-hand side reads upward.

I do not limit myself to any particular means for supporting the parts of the calendar.

In Figs. 1, 2, and 4 I have shown a suitable frame or casing K, upon the front of which the front part or face A of the calendar is suitably mounted, and within which casing the rolls L L, preferably in the form of spools of the width of the belt, are arranged that support and guide the movable part B, which is here in the form of an endless belt. Other means may, however, be employed to guide the belt. The journals of one of these rolls are mounted in slots M, Fig. 5, and the journals of the other roll in adjustable blocks N. These blocks may be adjusted for tightening the belt by the set-screws O. One of the rolls is provided with a knob P, by means of which the roll may be turned to adjust the movable part. In Figs. 8 to 14 a similar casing is employed. The movable part B is in the form of an endless belt and mounted in the same way as in Figs. 1 to 7. In this instance I have shown rubber blocks Q, forming cushions for the bearings of one of the rolls, and in such case the adjusting-screws may be omitted.

In Figs. 15 to 20 I have shown the two parts provided with a center pin or axis R and with spring-clips S, secured upon one part and projecting over the edge of the other. In this form the front part A is shown provided with suspending-loops T and the back part B with knobs U, by means of which it may be turned.

In Figs. 21 to 25 I have shown the front part A of rectangular form, with the back part B secured to turn thereon by the center pin R and the overlapping strips V. In this form the edges of the movable part B are shown projecting beyond the edges of the front A and may be grasped in order to turn the movable part B to adjust the calendar as desired, though I may have this projecting edge of the part B only in suitable places where a portion of the front part A has been cut out for that purpose.

I have hereinbefore stated that the front part A of the calendar is provided with openings through which the figures designating the units and tens of the year-numbers on part B are shown and that in connection with these openings there are placed on part A figures designating the centuries or the hundreds and thousands of the year-numbers. These openings and figures on part A bear certain definite relations to the other parts of the calendar, and I will now proceed to describe these relations and the manner of locating the year-openings and their related century-numbers.

The order of time is expressed on part B, as hereinbefore stated, by the order of the week-day characters, which in the belt forms of the calendar is down and upon the disk forms from left to right around the center or with the apparent motion of the sun. Of course in the disk forms this order of time is upward on the left of the center and downward on the right. This is simply preference and not necessity.

It will be noted here, as hereinbefore shown, that two of the columns of figures for years in a century on part B run in the order of time and two against it. The former are for the columns of century-figures on part A for old and new style Anno Domini, which run with time, and the latter for old style Before Christ and the error years, which run against time. It will also be noted here, as hereinbefore shown, that in the belt form of the calendar shown in Figs. 1 to 7 the columns of figures for years running with time are on the right side of the column of week-day characters on part B and of the column of month-day figures on part A and that the others are on the left in either case and that in both disk forms these columns are inside the columns of week-day characters and month-day figures, the two running with time being the outer and the other two the inner of the four. This is also simply preference and not necessity.

Hereinafter I use all terms indicating order of appearance or occurrence in relation to the order of time unless the numerical order is specifically mentioned.

In locating the columns of century figures on part A, I preferably commence with old style Anno Domini, and I use for it of the columns of years in any century on part B in the belt form of the calendar shown in Figs. 1 to 7 the left-hand column of the two on the right side and in the disk forms of the calendar the inner column of the two outer ones, and in the modified belt form of the calendar shown in Figs. 8 to 14 the upper portion of the part A. The first century of this style began with Saturday; but as the leap-year in all cases decides the proper set of the duplicate sets of week-day characters to be used for January 1 I take the year 4, the first leap-year in this style, which year began with Tuesday. This century is designated on part A by the figure "0," which is accompanied with an opening I in part A. This figure "0" must be placed in such vertical or curved column (near its beginning) and horizontal or radial row of subdivisions that the figures "04" in the proper column of figures for years of any century on part B will appear at the opening I in part A at the same time with the week-day character for Tuesday on part B at the opening C in part A for January 1 and with the figures "2" and "9" on part B at the openings D in part A. This locates the first century. The second century is designated upon part A by the figure "1," which is accompanied with an opening I in part A. This figure "1" must be placed in the same column of subdivisions on part A with the figure "0" for the first century, but in the second succeeding row of subdivisions. This locates the second century.

Every other succeeding century is located by placing the hundreds figure used in designating it upon part A in the same column of subdivisions with the like figure used in designating the next preceding century, but in the second succeeding row of subdivisions. Of course, as hereinbefore stated, the figure or figures used in designating a century on part A must be accompanied with an opening I on part A.

I preferably now take up old style Before Christ and use for it of the columns of figures for years in any century on part B in the belt form of the calendar shown in Figs. 1 to 7 the right-hand column of the two on the left side and in the disk forms of the calendar the next inner column to that one used for old style Anno Domini. The first year of the first century of this style, in order of numbers, began with Thursday and was a leap-year, so by locating this year the century will be located. This century is designated on part A by the figure "0," which is accompanied with an opening H in part A. This figure "0" must be placed in such vertical or curved column (near its ending) and horizontal or radial row of subdivisions that the figures "01" in the proper column of figures for years in any century on part B will appear at the opening H in part A at the same time with the week-day character for Thursday on part B at the opening C on part A for January 1 and with the figures "2" and "9" on part B at the openings D in part A for February 29. This locates this century.

The second century is designated on part A by the figure "1," which is accompanied with an opening H. This figure "1" must be placed in the same column of subdivisions with the figure "0" for the first century, but in the second succeeding row (in numerical order) of subdivisions. This locates the second century.

Every other successive century (in numerical order) is located by placing the hundreds figure used in designating it upon part A in the same column of subdivisions with the like figure used in designating the next preceding century, (in numerical order,) but in the second succeeding row (in numerical order) of subdivisions. Of course, as hereinbefore shown, the figure or figures used in designating a century on part A must be accompanied with an opening H on part A.

I preferably now take up new style and use for it of the columns of figures for years in any century on part B in the belt form of the calender shown in Figs. 1 to 7 the right-hand column, and in the two disk forms of the calendar the outer column, and in the modified belt form of the calendar shown in Figs. 8 to 14 the lower portion of part A.

New style began with October 15, 1582, but 1584 was the first leap-year and began with Sunday. This century is designated upon part A by the figures "15," which are accompanied by an opening J in part A. These figures "15" must be placed on part A with the figure "5" in such vertical or curved column (near its beginning or middle) and horizontal or radial row of subdivisions that the figures "84" in the proper column of figures for years in any century on part B will appear at the opening J in part A at the same time with the week-day character for Sunday on part B at the opening C in part A for January 1 and with the figures "2" and "9" upon part B at the openings D in part A for February 29. This locates this century.

The next succeeding century is designated on part A by the figures "16," which are accompanied by an opening J. These figures "16" must be placed upon part A with the figure "6" in the same column of subdivisions with the figure "5" for the next preceding century, but in the second succeeding row of subdivisions. This locates this century.

The next succeeding century is designated on part A by the figures "17," which are accompanied by an opening J. These figures "17" must be placed on part A with the figure "7" in the same column of subdivisions with the figure "6" for the next preceding century, but in the fourth succeeding row of subdivisions. This locates this century.

The next succeeding century is designated upon part A by the figures "18," which are accompanied with an opening J. This century is located with relation to "17" by exactly the same process used in locating "17" with relation to "16."

The next succeeding century is designated upon part A by the figures "19," which are accompanied by an opening J, and is located with relation to "18" by the same process used in locating "17" with relation to "16."

All subsequent centuries are located by a similar process. Noting that between the century containing the centennial year and the next succeeding century there is one row of subdivisions and between any other two centuries there are three rows of subdivisions, except, as hereinafter explained, as to the modified form of calendar shown in Figs. 8 to 14 and in the amplified form shown in Figs. 21 to 25.

I now take up the error years. This fractional century is designated upon part A by the one figure "0," which is accompanied by an opening (the only one in the column) G. The first leap-year was the year 12, which began with Sunday. This figure "0" must be placed on part A in such vertical or curved column (near its ending) and horizontal or radial row of subdivisions that the figures "12" in the special column of figures for these years on part B will appear at said opening G in part A at the same time with the week-day character for Sunday on part B at the opening C in part A for January 1 and with the figures "2" and "9" on part B at the openings D on part A for February 9. This locates these error years. It must be noted, finally, that in the modified belt form of calendar shown in Figs. 8 to 14 there is an exception to what has been said in placing the centennial leap-years, but which is clearly illustrated in Fig. 8; also, that in the amplified form shown in Figs. 21 to 25 there are two initial locations in each of the columns for old style Anno Domini and for old style Before Christ and for new style. The first of each of these two initial locations has hereinbefore been fully explained.

The second initial location for old style Anno Domini is of the century designated by the figures "22" on the right side of part A, of which the first leap-year will be the year 2204 and will begin with Monday.

The second initial location for old style Before Christ is of the century designated by figures "28" on the left side of part A, of which the first leap-year was the year 2801, which began with Thursday.

The second initial location for new style is of the century designated by the figures "20" on the right side of part A, of which the first leap-year will be the year 2204, which will begin with Thursday.

By using the same process for these second initial locations already used for the first ones these and the remaining centuries (in numerical order) in case of each style will be properly located. I do not, however, limit myself to any form of the parts of the calendar or any particular means for supporting, guiding, or adjusting them, as the same may be varied in many particulars without departing from my invention.

I claim as my invention—

1. The combination, in a calendar, with a front part provided with groups of figures representing the days of the months, and with successive rows of week-day openings, with seven openings in each row, of a movable back part provided with characters representing the week-days in duplicate sets of rows that are progressively arranged, and means for guiding the movable part, whereby, as said movable part is moved the rows of week-day characters are shown at said week-day openings, substantially as and for the purpose set forth.

2. The combination, in a calendar, with a front part, provided with groups of figures representing the days of the month, and with successive rows of openings, with seven openings in each row, arranged in the described relation to said groups of figures, of a movable back part provided with duplicate sets or rows of week-day characters that are progressively arranged in series, as described, and means for guiding said movable part, substantially as and for the purpose set forth.

3. The combination, in a calendar, with a front part, provided with groups of figures representing the days of the months, with successive rows of openings, with seven openings in each row, arranged as described over the month-day figures, and provided also with two openings in the same row or in one of the same rows of subdivisions with and in the column of subdivisions next following the figures representing February 28, (said last-named openings being separated by one subdivision,) of a movable back part provided with duplicate sets or rows of week-day characters that are progressively arranged and with the figures "2" and "9" arranged each on the adjoining subdivision on either side of the middle week-day character in one set of the duplicate sets that are progressively arranged, and means for guiding the movement of said movable part, substantially as and for the purpose set forth.

4. The combination, in a calendar, with a front part, provided with groups of figures representing the days of the months, with successive rows of openings, having seven openings in each row, arranged over the month-day figures, as described, and provided also with two openings, in the same row, or in one of the same rows of subdivisions with and in the column of subdivisions next following the figures representing February 28, (said last-named openings being separated by one subdivision below and in the same column of subdivisions with the middle opening in the upper row of week-day openings) and provided also with one or more columns of openings preceded by figures or characters representing the hundreds and thousands of years, of a movable part provided with duplicate sets or rows of week-day characters that are progressively arranged, with seven characters in each set or row that are progressively arranged in the set or row, with the figures "2" and "9" arranged each in the adjoining subdivision on either side of the middle week-day character in one set of said duplicate sets that are progressively arranged, said movable part being also provided with columns of figures or characters representing the units and tens of the years, whereby when said movable part is adjusted to show, with figures on the front part, the number representing any year whether a common or leap year, the two parts will also show the days of the week and days of the month for that year, substantially as described and for the purpose set forth.

5. The combination, in a calendar, with a front part having century-numerals thereon and openings adjacent thereto; having numerals for the days of the months and openings adjacent thereto, and separate openings for the figures representing the 29th day of February, of a movable back part having week-day characters in duplicate sets that are progressively arranged, so that whenever week-day characters of one set of the duplicate sets appear through the openings in the front part corresponding to January and February, week-day characters from the other set of the duplicate sets appear in connection with the other months, said back part having also numerals for indicating the 29th day of February, and year-numerals so arranged that when they indicate the desired year in connection with the century-numerals the calendar is set correctly for that entire year, substantially as described.

6. The combination, in a calendar, with a front part provided with groups of figures representing the days of the months, and having successive rows of openings C for the week-day characters that with such figures complete the calendar for each month, and having separate openings for the figures representing the 29th day of February, of a movable back part having week-day characters F in duplicate sets that are progressively arranged and also having the figures "2" and "9" arranged upon opposite sides of the middle character of each alternate set of the duplicate sets, said sets of week-day characters being progressively and continuously arranged and so related to the openings in the front part that when the week-day characters of one set of the duplicate sets appear through the openings in the front part for January and February, characters from the other set of the duplicate sets will appear in connection with the other months, and, on leap-years the figures "2" and "9" will appear in the February-29 openings, said front part also having year-openings, and said back part having numerals arranged in order thereon and so related to the sets of duplicate sets of week-day characters that placing the figures for any leap-year in said year-openings will arrange said week-day characters in proper relation to the figures representing the days of the months for that year.

7. A calendar comprising a back part bearing week-day characters in duplicate sets that are progressively, successively and regularly arranged and said part also bearing year-figures successively, but irregularly arranged, according to the kinds of years, and one set of each of said duplicate sets having the figures "2" and "9," in combination, with a face part bearing figures representing the days of the months, and having week-day, 29th-of-February and figured year perforations so arranged that the indications of the year, by the adjustment of the parts, completes the calendar for that year, whether a leap-year or a common year, substantially as described.

8. The combination, in a calendar, with a front part provided with suitable openings and calendar indications, of a movable back part provided with week-day characters in duplicate sets that are progressively arranged, and said back part being also provided with the figures "2" and "9" arranged upon opposite sides of a character of each alternate set, for the purpose set forth.

9. The combination, in a calender, with a front part provided with calendar indications, and with means whereby the indications on the front part and the characters on the back part may coact, of a movable back part provided with duplicate sets of week-day characters that are progressively arranged, for the purpose set forth.

10. In a calendar, the combination, with a front part bearing calendar indications for the several months that are progressively arranged and provided with means whereby the indications on the front part and the characters on the back part can coact, of a back part provided with week-day characters in duplicate sets that are progressively arranged, so that whenever, for a common year, one set of a duplicate set coacts with said calendar indications upon the front part for January and February, the other set of the like duplicate sets will coact with the calendar indications upon the front part for the other months, substantially as described.

11. In a calendar, the combination, with a front part bearing calendar indications for the several months that are progressively arranged and provided with means whereby the indications on the front part and the characters on the back part can coact, of a back part provided with week-day characters in duplicate sets that are progressively arranged, so that whenever, for a leap-year, one set of a duplicate set coacts with the calendar indications upon the front part for January and February, the other set of other duplicate sets, that next follow in the order of said progressive arrangement a duplicate set like the duplicate set of which one set coacts with the calendar indications upon the front part for January and February, will coact with other calendar indications upon the front part for the other months, substantially as described.

12. In a calendar, the combination, with a front part bearing calendar indications for the several months that are progressively arranged and provided with means whereby the indications on the front part and the characters and figures on the back part can coact, of a back part bearing week-day characters in duplicate sets that are progressively arranged, having a week-day character in one set of each duplicate set immediately preceded by the figure "2" and followed by the figure "9," so that whenever, for a leap-year, one set of a duplicate set coacts with the calendar indications upon the front part for January and February, the figures "2" and "9" in one set of another duplicate set will so coact with the calendar indications on the front part for February as to complete such indications for that month, substantially as described.

13. In a calendar, the combination, with a front part bearing indications for centuries that are progressively arranged and calendar indications for the several months that are progressively arranged and provided with means whereby the indications on the front part and the indications and characters on the back part can coact, of a back part bearing indications for the years in any century that are progressively arranged and week-day characters in duplicate sets that are progressively arranged, so that whenever, the indications upon the back part for any common year in any century coact with the indications upon the front part for any century, thus completing the calendar indications for that common year, one set of a duplicate set of the week-day characters upon the back part proper for January and February of that common year, will coact with the calendar indications upon the front part for such months, and the other set of other like duplicate sets will coact with the calendar indications upon the front part for the other months, substantially as described.

14. In a calendar, the combination, with a front part, bearing indications for centuries that are progressively arranged and calendar indications for the several months that are progressively arranged and provided with means whereby the indications on the front part and the indications and characters and figures on the back part can coact, of a back part bearing indications for the years in any century that are progressively arranged, and week-day characters in duplicate sets that are progressively arranged, having a week-day character of one set of each duplicate set immediately preceded by the figure "2" and followed by the figure "9," so that whenever, the indications upon the back part for any leap-year in any century coact with the indications upon the front part for any century, thus completing the calendar indications for that leap-year, one set of a duplicate set of the week-day characters upon the back part proper for January and February of that leap-year will coact with the calendar indications upon the front part for such months, and the other set of other duplicate sets, that follow next in the order of said progressive arrangement a like duplicate set to the duplicate set of which one set coacts with the calendar indications upon the front part for January and February, will coact with the calendar indications upon the front part for the other months, and the figures "2" and "9" in one set of another duplicate set will so coact with the calendar indications on the front part for February as to complete such indications for that month, thus forming a calendar for that leap-year, substantially as described.

15. In a calendar, the combination, with a front part bearing calendar indications for the several months that are progressively arranged and provided with means whereby the indications on the front part and the indications and characters and figures on the back part can coact, of a back part bearing week-day characters in duplicate sets that are progressively arranged, so that whenever one set of a duplicate set coacts with the calendar indications on the front part for January and February, sets of other duplicate sets will coact with the indications upon the front part for the other months respectively, one set of each duplicate set including the figures "2" and "9," and said front and back parts respectively bearing century and year indications coacting to complete the calendar for any year, all substantially as and for the purpose specified.

In testimony whereof I have hereunto set my hand, this 17th day of October, 1898, at Minneapolis, Minnesota.

SALMON A. BUELL.

In presence of—
A. C. PAUL,
M. E. GOOLEY.